(12) United States Patent
Takeda

(10) Patent No.: US 8,794,388 B2
(45) Date of Patent: Aug. 5, 2014

(54) ELEVATOR GROUP CONTROL APPARATUS

(75) Inventor: Yoshihiro Takeda, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 498 days.

(21) Appl. No.: 13/211,805

(22) Filed: Aug. 17, 2011

(65) Prior Publication Data

US 2012/0055742 A1    Mar. 8, 2012

(30) Foreign Application Priority Data

Sep. 6, 2010  (JP) ................................. 2010-199357

(51) Int. Cl.
*B66B 1/18* (2006.01)

(52) U.S. Cl.
USPC ......................................................... 187/382

(58) Field of Classification Search
USPC ............. 187/247, 380–389, 391, 393; 700/52
See application file for complete search history.

(56) References Cited

U.S. PATENT DOCUMENTS

| | | | | |
|---|---|---|---|---|
| 4,562,530 | A * | 12/1985 | Umeda et al. ................... | 700/52 |
| 4,567,558 | A * | 1/1986 | Umeda et al. ................... | 700/52 |
| 4,947,965 | A * | 8/1990 | Kuzunuki et al. .............. | 187/387 |
| 5,780,789 | A * | 7/1998 | Tsuji .............................. | 187/382 |
| 6,000,504 | A * | 12/1999 | Koh et al. ....................... | 187/382 |
| 7,104,363 | B2 * | 9/2006 | Mori et al. ..................... | 187/290 |
| 8,006,807 | B2 | 8/2011 | Kobori et al. | |
| 2008/0105499 | A1 * | 5/2008 | Tyni et al. ..................... | 187/382 |
| 2010/0230213 | A1 | 9/2010 | Kobori et al. | |
| 2011/0198160 | A1 * | 8/2011 | Suzuki et al. ................. | 187/382 |

FOREIGN PATENT DOCUMENTS

| | | |
|---|---|---|
| CN | 101466629 A | 6/2009 |
| JP | 57-090368 A | 6/1982 |
| JP | 10-036019 A | 2/1998 |
| JP | 2829153 B2 | 9/1998 |
| JP | 11-278762 A | 10/1999 |
| JP | 2005-057846 A | 3/2005 |
| JP | 2007-284149 A | 11/2007 |
| JP | 2007-284180 A | 11/2007 |
| WO | WO 2010/047201 A1 | 4/2010 |

* cited by examiner

*Primary Examiner* — Anthony Salata
(74) *Attorney, Agent, or Firm* — Foley & Lardner LLP

(57) ABSTRACT

According to one embodiment, an elevator group control apparatus performs group control of operations of cars. The apparatus includes a power consumption calculation unit that calculates power consumption when each of the cars is run according to the operation curve on the basis of object data stored in the object data storage unit and an operation curve created by the operation curve creation unit, a distributed waiting controller that sets a car in a waiting state among the cars as a distributed waiting target car and outputs a distributed waiting instruction to move the target car to a distributed waiting floor, and a distribution instruction controller that obtains, from the power consumption calculation unit, power consumption when the distributed waiting target car is moved to the distributed waiting floor and, on the basis of the power consumption, permits or inhibits a distributed waiting instruction output from the distributed waiting controller.

10 Claims, 14 Drawing Sheets

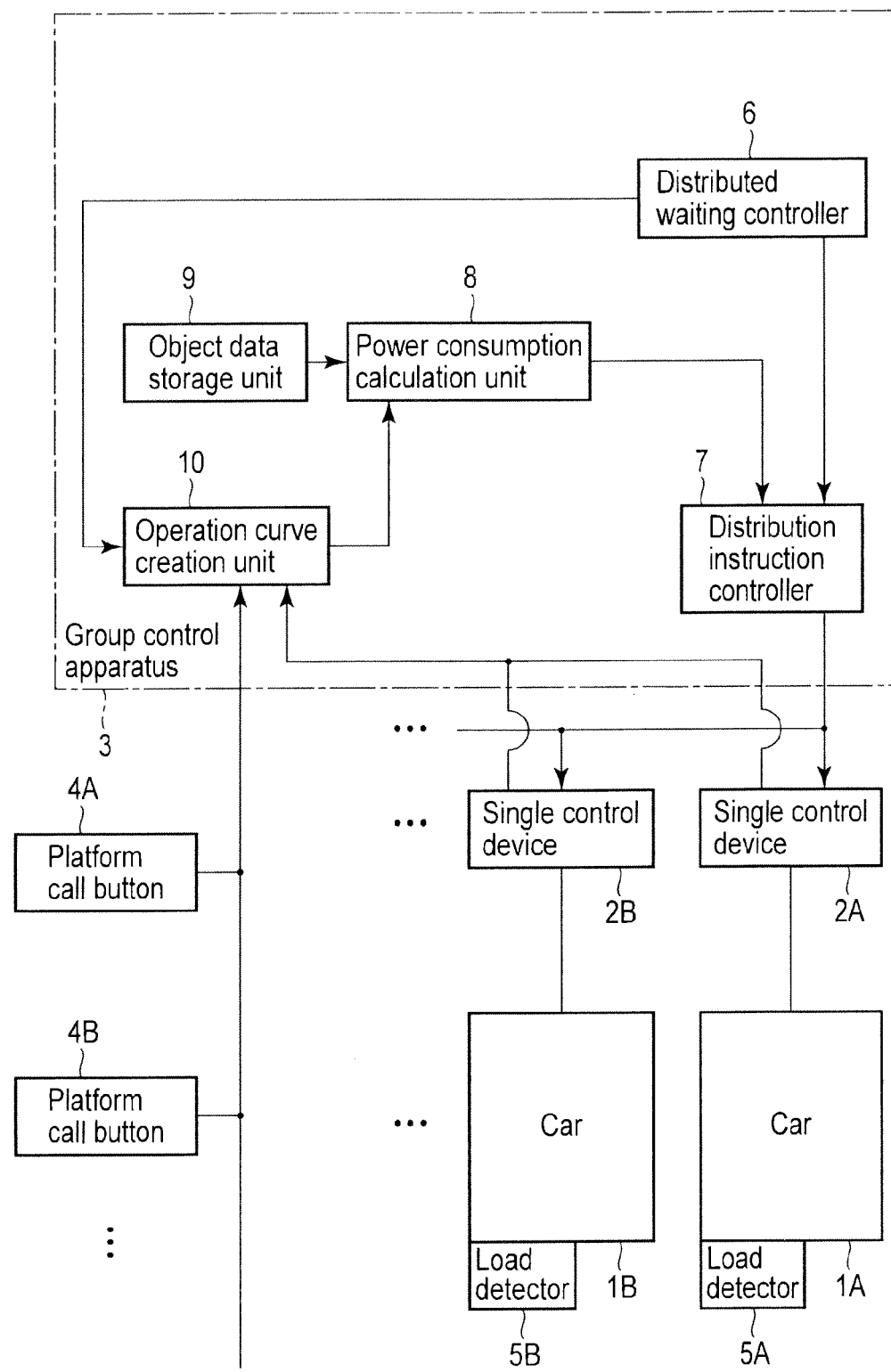
F I G. 1

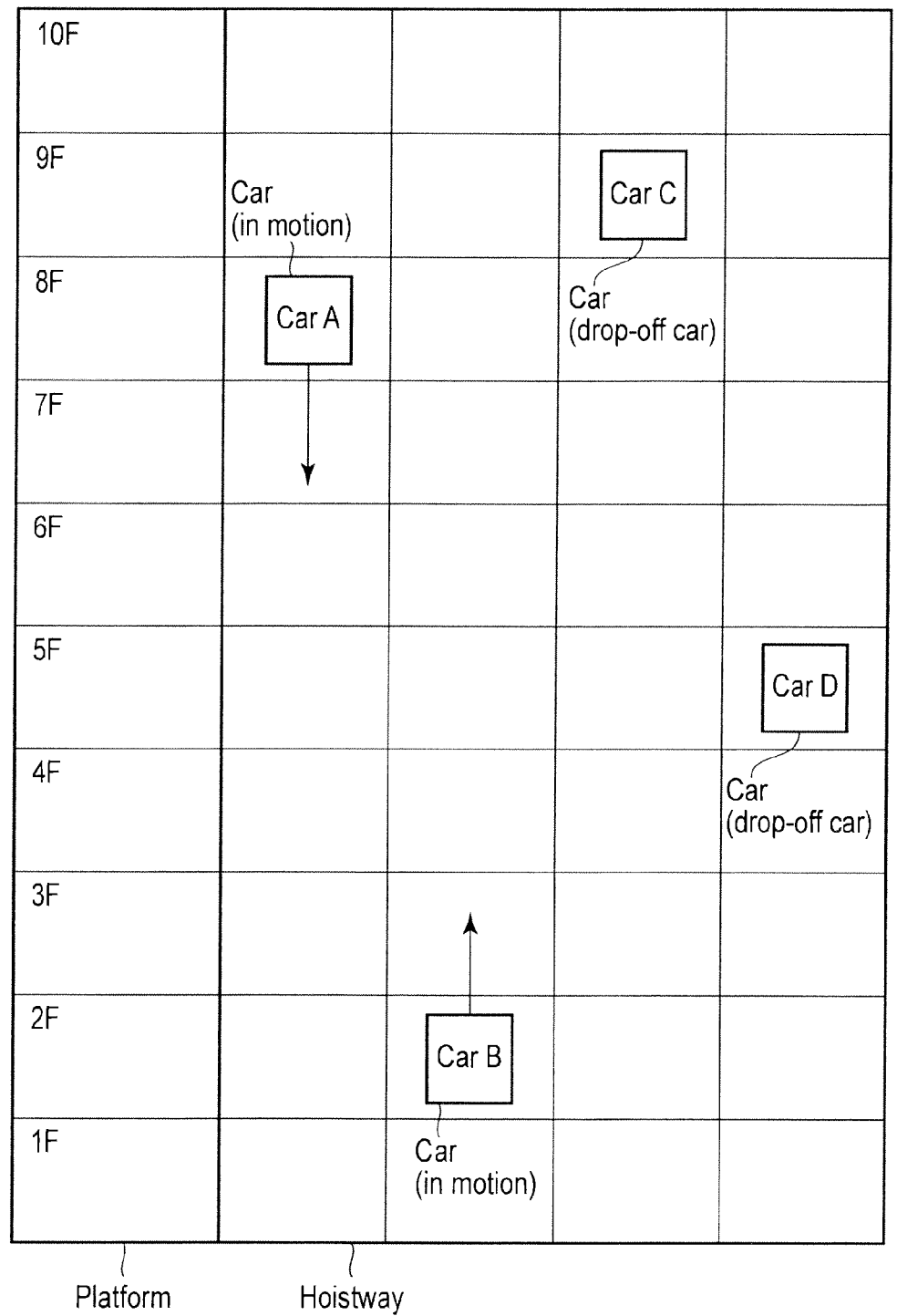
F I G. 4

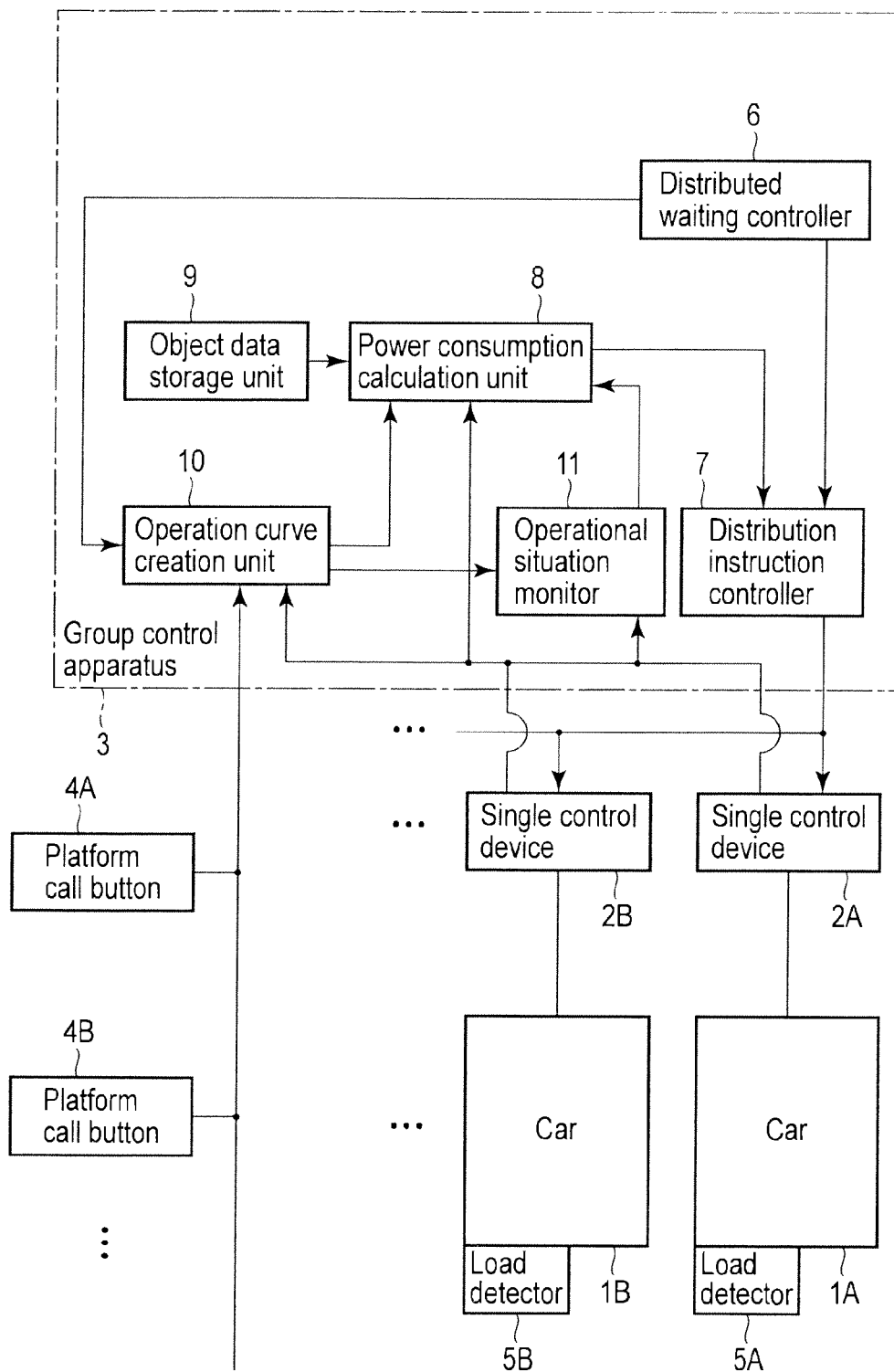
F I G. 7

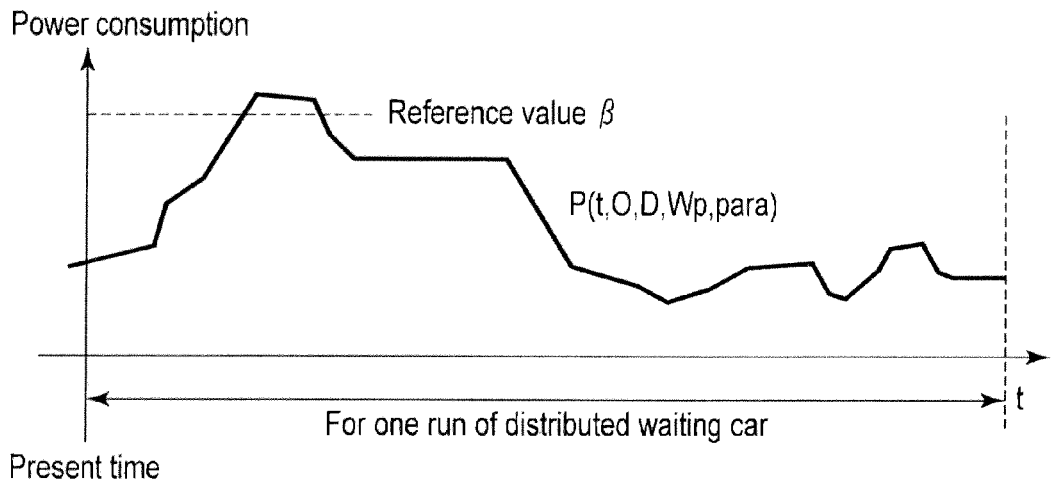
F I G. 1 4 A
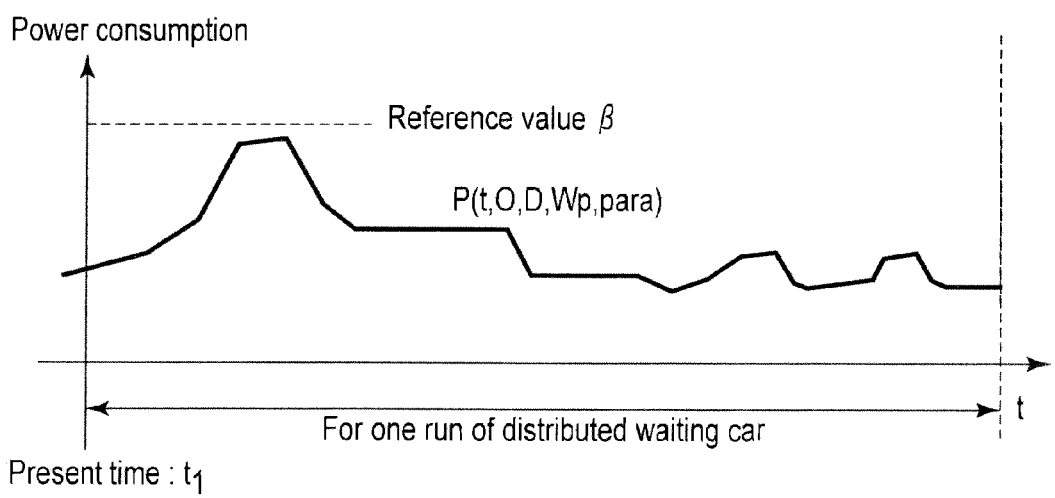
F I G. 1 4 B

ELEVATOR GROUP CONTROL APPARATUS

CROSS-REFERENCE TO RELATED APPLICATIONS

This application is based upon and claims the benefit of priority from prior Japanese Patent Application No. 2010-199357, filed Sep. 6, 2010, the entire contents of which are incorporated herein by reference.

FIELD

Embodiments described herein relate generally to an elevator group control apparatus which controls the operation of a plurality of elevators (or cars).

BACKGROUND

One known elevator group control apparatus has a distributed waiting function of causing drop-off cars to stand by on arbitrary floors of a building in a distributed manner to improve the performance of response to nearby floors. A "drop-off car" means a car that is in a waiting state with no call (platform call or car call) coming in after a passenger has got off the car.

In the distributed waiting function, it is necessary to consider on which floor of the building a "drop-off car" should be stationed in advance to improve the overall operating efficiency. Generally, distributed waiting floors are set so that the service areas of the individual cars may be uniform in the future, taking into account the operational situation of each car in service.

However, even if the drop-off car has been moved to the determined distributed waiting floor, a platform call is not necessarily made on the floor or a nearby floor. In that case, it means that a car will have been moved uselessly, and electric power will have been wasted.

In performing distributed waiting, it is common practice to determine only on the basis of the present operational situation whether to perform distributed waiting, taking no account of electric power consumed by the movement of a drop-off car. Therefore, the power loss might become large when there was no call on the waiting floor or a nearby floor after the distributed waiting.

Accordingly, an elevator group control apparatus capable of performing distributed waiting efficiently while suppressing wasteful power consumption as much as possible has been desired.

BRIEF DESCRIPTION OF THE DRAWINGS

FIG. 1 is a block diagram showing an overall configuration of an elevator group control apparatus according to a first embodiment;

FIG. 4 is a diagram to explain distributed waiting performed by an elevator group control apparatus according to a second embodiment;

FIG. 7 is a block diagram showing an overall configuration of an elevator group control apparatus according to a third embodiment;

FIGS. 14A and 14B show a power consumption calculation result obtained by a power consumption calculation unit provided in the elevator group control apparatus of the sixth embodiment, FIG. 14A showing the state of power consumption when car C has been moved to a distributed waiting floor and FIG. 14B showing the state of power consumption when car D has been moved to a distributed waiting floor.

DETAILED DESCRIPTION

Figure 2:
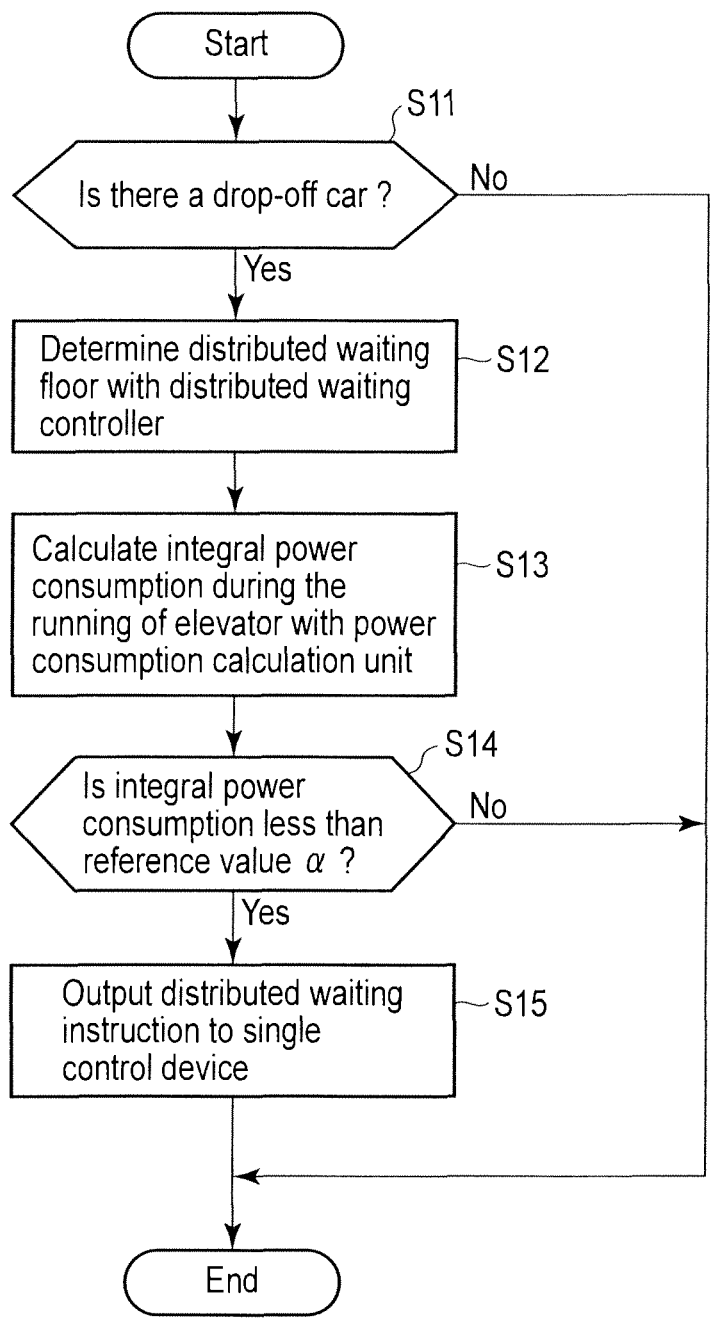
FIG. 2 is a flowchart to explain a distributed waiting operation performed by the elevator group control apparatus according to the first embodiment.

Embodiments of the present invention will be described below with reference to the drawings. In general, according to one embodiment, there is provided an elevator group control apparatus that performs group control of operations of a plurality of cars. The elevator group control apparatus includes an object data storage unit that stores a unique parameter as object data for each object with regard to a building and an elevator, an operation curve creation unit that creates an operation curve indicating a future operational situation on the basis of call entry information for each of the cars, a power consumption calculation unit that calculates power consumption when each of the cars is run according to the operation curve on the basis of object data stored in the object data storage unit and an operation curve created by the operation curve creation unit, a distributed waiting controller that sets a car in a waiting state among the cars as a distributed waiting target car and outputs a distributed waiting instruction to move the target car to a distributed waiting floor, and a distribution instruction controller that obtains, from the power consumption calculation unit, power consumption when the distributed waiting target car is moved to the distributed waiting floor and, on the basis of the power consumption, permits or inhibits a distributed waiting instruction output from the distributed waiting controller.

First Embodiment

FIG. 1 is a block diagram showing an overall configuration of an elevator group control apparatus according to a first embodiment. Hereinafter, an "elevator" basically indicates a "car." When a plurality of elevators are used, they are also called, for example, a target car, car A, car B, and the like.

In a hoistway of a building, a plurality of cars 1A, 1B, . . . are installed side by side to provide elevator services to each floor. A driving mechanism for causing cars 1A, 1B, . . . to go up and down, including a hoist and rope, is not shown in the figure. The operations of cars 1A, 1B, . . . are controlled by single control devices 2A, 2B, . . . provided so as to correspond to cars 1A, 1B, . . . , respectively.

A group control apparatus 3, which functions as a main control apparatus, performs group control of the operations of cars 1A, 1B, . . . . The single control devices 2A, 2B, . . . and platform call buttons 4A, 4B, . . . provided at the platform on each floor are connected to the group control apparatus 3. When a platform call has been made by the operation of any one of the platform call buttons 4A, 4B, . . . , the group control apparatus 3 acquires operating information (including the present car position and running direction) on cars 1A, 1B, . . . from the single control devices 2A, 2B, . . . , selects the optimum one from cars 1A, 1B, . . . according to a specific evaluation formula, and performs control, including the allocation of the platform call.

In the first embodiment, the group control apparatus 3 includes the following structural elements to realize a distributed waiting function: a distributed waiting controller 6, a distributed instruction controller 7, a power consumption calculation unit 8, an object data storage unit 9, and an operation curve creation unit 10.

The distributed waiting controller 6 sets, as a distributed waiting target car, a so-called "drop-off car" which has finished answering all the calls (including platform calls and car calls) among cars 1A, 1B, . . . and gone into a waiting state.

A "platform call" means a call signal entered by the operation of platform call buttons 4A, 4B, . . . installed at the platform on each floor. A "platform call" includes information on an entered floor and a destination direction. A "car call" means a call signal entered by the operation of a destination call button (not shown) provided in each of cars 1A, 1B, . . . . A "car call" includes information on a destination floor.

"Distributed waiting" is such that a drop-off car is set as a distributed waiting target car to shorten the time required to make an answer after the user entered a platform call and the target car is moved in advance to, for example, a floor used most frequently in the building or a floor close to this floor.

The operation curve creation unit 10 creates an operation curve that represents a future operating state for each of cars 1A, 1B, . . . on the basis of entry information on calls (platform calls and car calls).

The power consumption calculation unit 8 calculates a power consumption of each of cars 1A, 1B, . . . run according to an operation curve created by the operation curve creation unit 10. The power consumption can be calculated using a general physical equation. For example, the following equation (1) holds:

$$P(t, O, D, Wp, para) = P_M(t, O, D, Wp, para) + \\ P_{INV}(t, O, D, Wp, para) + P_{loss}(t,, O, D, Wp, para) + P_{const} \quad (1)$$

where P(t, O, D, Wp, para) is electric power consumed by one run of an elevator (or car) and is represented as a function of time t.

O and D indicate a departure floor and a destination floor, respectively. The operation curve creation unit 10 gives O and D to the power consumption calculation unit 8. Wp represents a ride rate (%). "para" represents parameters unique to each object with respect to a building and an elevator. Specifically, the unique parameters include the height of a floor of a building, the rated speed and acceleration of an elevator, the mass of a car and rope, and the radius of a motor shaft. These parameters are stored as object data in an object data storage unit 9. If these parameters have been determined, power consumption can be calculated on the basis of the departure floor and destination floor and the ride rate.

$P_M(t, O, D, Wp, para)$ is electric power consumed by a motor (hoist) (not shown). $P_{INV}(t, O, D, Wp, para)$ is electric power consumed by a main power circuit part (not shown), including an inverter and transformer. $P_{loss}(t, O, D, Wp, para)$ represents a loss caused by friction between a sheave and rope (not shown) and between a guide and a rail (not shown), air resistance, and others. $P_{const}$ represents electric power used by other control devices. $P_{const}$ is assumed to be a fixed value.

As described above, the power consumption per run of an elevator can be calculated by adding the electric power consumed by each device and the loss caused by each device.

The ride rate can be calculated from the loads detected by load detectors 5A, 5B, . . . installed in cars 1A, 1B, . . . , respectively. In addition, there is another method of, for example, installing a pressure sensor on a rope hitch unit (not shown) and calculating a ride rate from the measurement result of the pressure sensor.

The running of a general elevator includes power running and regenerative running. "Power running" indicates a state where a motor is performing work and corresponds to, for example, upward running when the car is heavier than the counterweight.

Conversely, in downward running when the car is heavier than the counterweight, the motor rotates, generating electric power, which can be returned to the power supply side. The electric power generated at this time is called "regenerative electric power" and the running state at that time is called "regenerative running." When regenerative running is performed, the power consumption $P_M(t, O, D, Wp, para)$ in the motor becomes as negative as the regenerative electric power generated at that time.

Hereinafter, although an explanation will be given on the assumption of a system that returns regenerative electric power to the power supply side, the calculating formula for power consumption can be applied to another system by modifying the formula suitably according to the system even in the case of a system of consuming regenerative electric power by a resistance as heat or a system of not generating regenerative electric power, such as a drum-type elevator with no counterweight or a self-propelled elevator.

Distributed waiting is performed by outputting a distributed waiting instruction from the distributed waiting controller 6 when any one of cars 1A, 1B, . . . has gone into a waiting state and the car has been set as a distributed waiting target car. In the first embodiment, there is provided a distribution instruction controller 7 that determines from an energy saving viewpoint whether to permit or inhibit the output of the distributed waiting instruction.

The distribution instruction controller 7 determines on the basis of the calculation result of the power consumption calculation unit 8 whether to move the distributed waiting target car to the distributed waiting floor determined by the distributed waiting controller 6. The distribution instruction controller 7 performs control so as to permit the output of a distributed waiting instruction if the target car is allowed to move and to inhibit the output of a distributed waiting instruction if the target car is not allowed to move.

An explanation will be given on the assumption that a car is set as a distributed waiting target car and moved to a predetermined distributed waiting floor.

FIG. 2 is a flowchart to explain a distributed waiting operation performed by the elevator group control apparatus 3.

First, the distributed waiting controller 6 determines whether there is a car that has answered all the calls (platform calls and car calls) and gone into the waiting state (that is, a drop-off car) in cars 1A, 1B, . . . (step S11).

If the corresponding car has been found (YES in step S11), the distributed waiting controller 6 sets the drop-off car as a distributed waiting target car and outputs a distributed waiting instruction to move the target car to a distributed waiting floor to the distribution instruction controller 7 (step S12).

Here, the power consumption calculation unit 8 calculates integral power consumption, the integral of power consumption with respect to time, when the distributed waiting target car has been moved from the present position to the distributed waiting floor (step S13). The distribution instruction controller 7 compares the calculated integral power consumption with a preset reference value α of integral power consumption (step S14).

As a result, if the calculated integral power consumption is less than the reference value α (YES in step S14), the distribution instruction controller 7 permits a distributed waiting instruction and outputs a distributed waiting instruction to the corresponding one of the single control devices 2A, 2B, . . . (step S15). If the calculated integral power consumption is equal to or larger than the reference value α, the distribution instruction controller 7 inhibits a distributed waiting instruction and does not perform distributed waiting this time.

Here, suppose the reference value α is set to about half the integral power consumption required, for example, for a car to move from the lowest floor to the highest floor.

In addition, the calculation of integral power consumption done in step S13 is made using a time function $P(t, O, D, W_p, para)$ of power consumption described above. That is, the integral power consumption can be calculated by integrating the time function with respect to a specific period. The "specific period" is the time from move start time t1 to move end time t2 of the distributed waiting target car.

Figure 3:
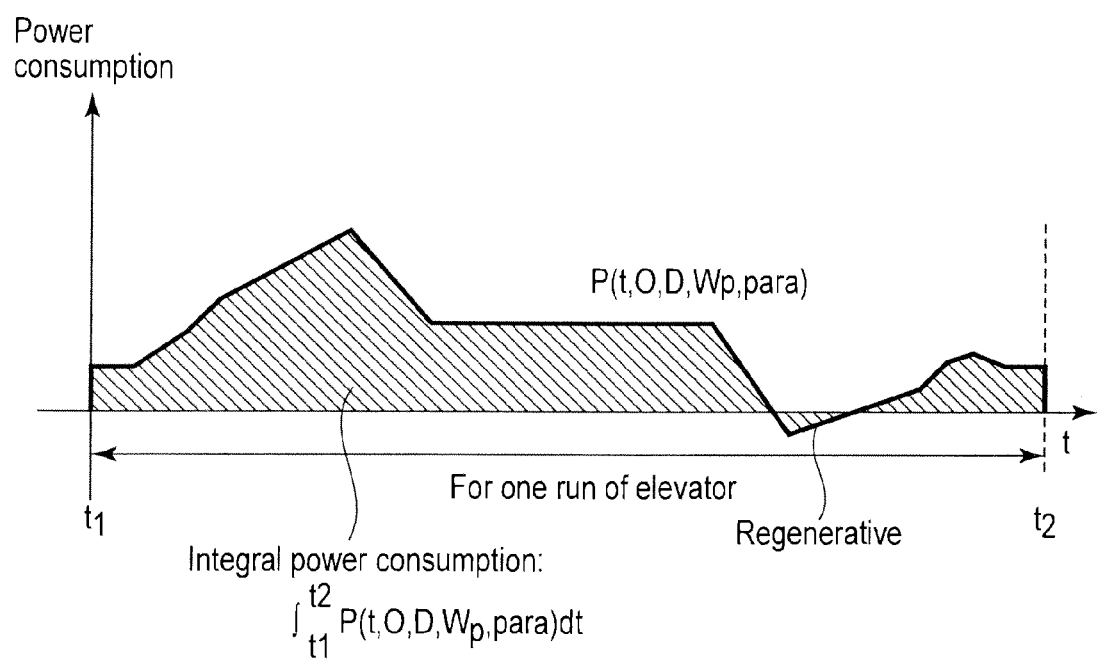
FIG. 3 shows a power consumption calculation result obtained by a power consumption calculation unit provided in the elevator group control apparatus of the first embodiment.

FIG. 3 is a graphic representation of a power consumption calculation result obtained by the power consumption calculation unit 8. The integral power consumption is the integral of the power consumption with respect to time from t1 to t2 and is calculated using the following expression (2):

$$\int_{t1}^{t2} P(t,O,D,W_p,para)dt \quad (2)$$

In FIG. 3, the shaded area represents the integral power consumption. In this example, however, since regenerative electric power was generated during movement, the value obtained by subtracting the electric energy of the regenerative electric power from the original electric energy is the final integral power consumption.

As described above, with the first embodiment, the power consumption when a drop-off car set as a distributed waiting target car moves to a distributed waiting floor is calculated and distributed waiting is performed if the integral power consumption is less than the reference value. This makes it possible to realize efficient distributed waiting by preventing electric power from being consumed uselessly due to careless distributed waiting.

One method of determining whether to perform distributed waiting is to make a determination on the basis of the distance to a distributed waiting floor. However, such a method of making a determination on the basis of the distance takes no account of actual power consumption due to car load or acceleration and deceleration and therefore more electric power might be consumed than expected even if the distance is short. Accordingly, the power loss might be large when there is no call on the distributed waiting floor or a nearby floor after the distributed waiting.

In contrast, with the first embodiment, the integral power consumption when the distributed waiting target car moves to a distributed waiting floor is used as a criterion. Therefore, distributed waiting can be performed, taking practical power consumption into account. In addition, the power loss when there is no call on the distributed waiting floor or a nearby floor after the distributed waiting can be suppressed as much as possible.

Second Embodiment

Next, a second embodiment will be explained.

In the first embodiment, whether to perform distributed waiting has been determined on the basis of the power consumption of a drop-off car, a distributed waiting target car. In contrast, the second embodiment is characterized by determining whether to perform distributed waiting on the basis of the power consumption of all the elevators including the other cars, taking into account the operational situation of not only a drop-off car but also the other cars.

The basic configuration of the second embodiment is the same as that of FIG. 1 and therefore a determination of whether to perform distributed waiting will be explained with reference to FIG. 4 to FIG. 6B.

For example, as shown in FIG. 4, in a group control system with four cars, car A to car D, suppose car A and car B are moving as a result of a platform call or a car call and car C and car D are drop-off cars that have answered all calls and gone into a waiting state.

An explanation will be given on the assumption that car D is caused to perform distributed waiting.

The distributed waiting controller 6 outputs a distributed waiting instruction for car D, a drop-off car, to the distribution instruction controller 7. Having received the distributed waiting instruction, the distribution instruction controller 7 refers to the power consumption of car A and car B in operation calculated by the power consumption calculation unit 8 and an increase in the power consumption when car D, a target of a distributed waiting instruction, is moved to a preset distributed waiting floor.

Here, when the power consumption of car A and car B in operation is calculated, an operation curve created by the operation curve creation unit 10 provided in the group control apparatus 3 is used.

The operation curve creation unit 10 holds information on platform calls entered by the operation of platform call buttons 4A, 4B, . . . , the allocation result of the platform calls, and information on car calls entered in cars 1A, 1B, . . . , and, on the basis of these pieces of information, creates an operation curve that indicates by what route each car will move from the present into the future. A generally known method of creating an operation curve is assumed to be used and a detailed explanation thereof will be omitted here.

The power consumption calculation unit 8 determines the operational situation of each car from an operation curve created by the operation curve creation unit 10 and calculates the power consumption of a car in operation by the method described in the first embodiment.

Figure 5:
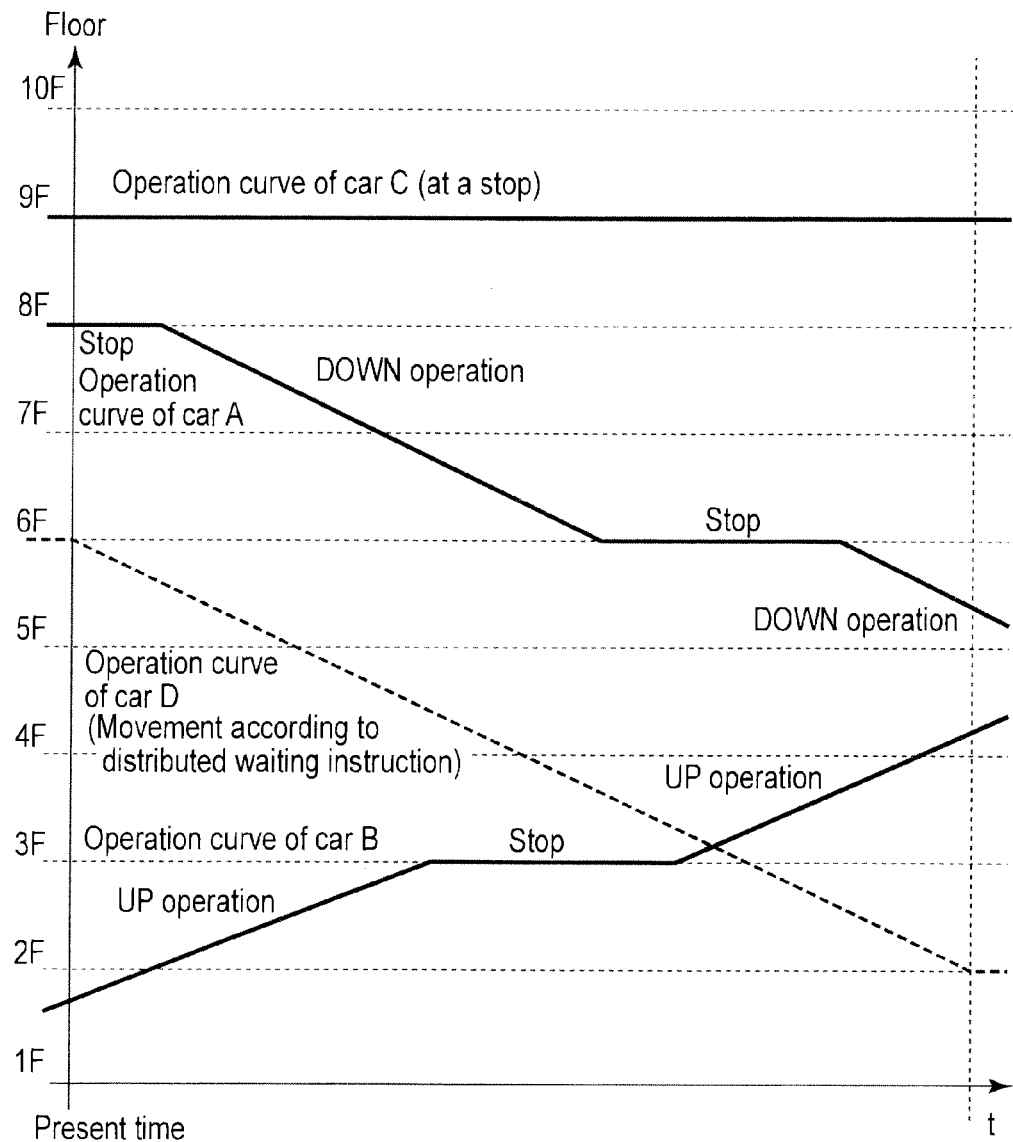
FIG. 5 shows an example of operation curves of cars A to D controlled by the elevator group control apparatus of the second embodiment.

Now, suppose the operation curves of car A to car D are as shown in FIG. 5.

Suppose car A and car B are in operation. Suppose car A moves from an eighth floor to a sixth floor in a DOWN direction, stops at the sixth floor, and then moves again toward a lower-level floor. Suppose car B moves from a lower-level floor than a second floor in a UP direction, stops at a third floor, and then moves again toward a higher-level floor.

Figure 6A:
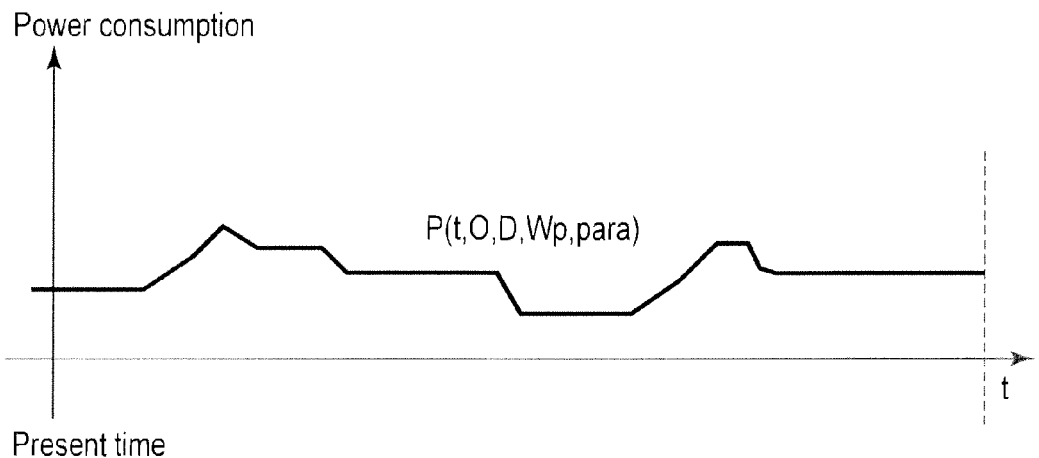
FIGS. 6A and 6B show a power consumption calculation result obtained by a power consumption calculation unit provided in the elevator group control apparatus of the second embodiment, FIG. 6A showing the state of power consumption before car D was moved and FIG. 6B showing the state of power consumption when car D has been moved.

Car C and car D, a distributed waiting target car, are at a stop as drop-off cars at a ninth floor and the sixth floor, respectively. In addition, suppose the power consumption needed to operate car A to car D calculated by the power consumption calculation unit 8 was as shown in FIG. 6A.

Figure 6B:
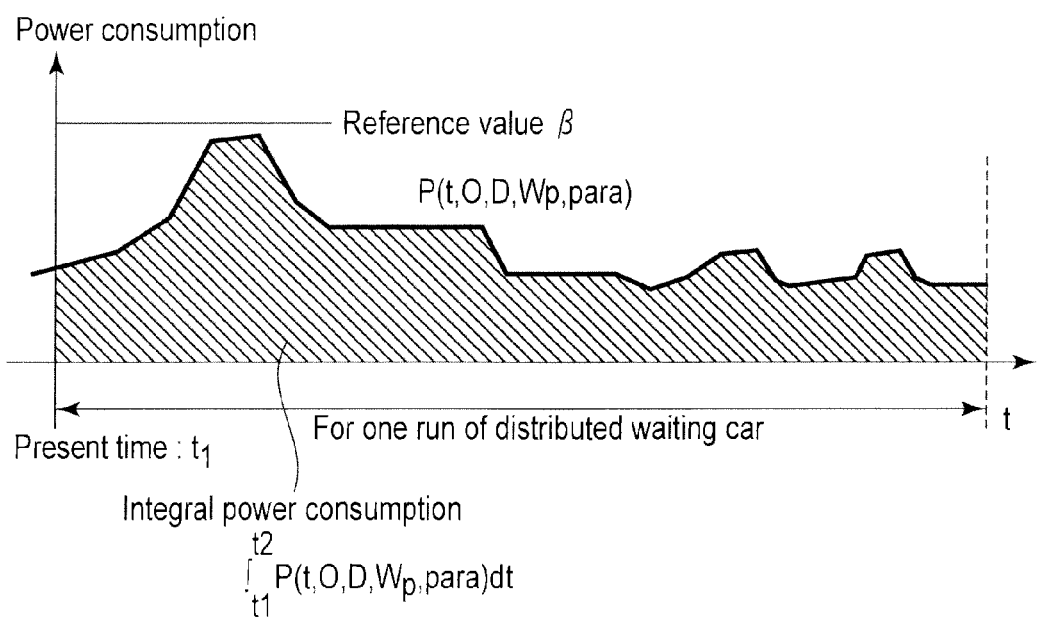

At this time, when car D, a distributed waiting target car, is moved from the sixth floor to the second floor as shown by a dotted line in FIG. 5, a power consumption curve changes as shown in FIG. 6B because electric power is consumed. Since car D is run in the DOWN direction in a power running operation, the overall power consumption increases.

As described above, suppose the distributed waiting target car has been moved from the present position to the distributed waiting floor. On the basis of the power consumption of all the elevators, including the electric power consumed when other cars moved according to the operation curves during the movement of the target car, whether to perform distributed waiting is determined.

In this case, the electric energy obtained by integrating power consumption during the time when the distributed waiting target car is moving or the peak value (maximum value) of the power consumption during the time when the distributed waiting target car is moving may be used as information for making a determination.

When whether to perform distributed waiting is determined on the basis of the integral power consumption, a time average value of electric energy of the shaded portion in FIG. 6B is calculated as follows. When the time average value is less than a preset reference value α of integral power consumption, the distributed waiting instruction controller 7 gives a distributed waiting permit instruction.

$$\frac{1}{t_2 - t_1} \int_{t_1}^{t_2} P(t, O, D, Wp, para) dt \quad (3)$$

Here, the reason why the time average of the integral power consumption is struck is that the integral power consumption obtained using expression (2) depends on the movement time of a distributed waiting target car: t2−t1 when electric power is calculated for a plurality of cars and therefore is difficult to deal with in terms of an evaluation object.

Specifically, for example, when other cars are in a power running operation and the distributed waiting target car also goes into a power running operation, the integral power consumption increases in accordance with the movement time, i.e., how far away a distributed waiting floor is from the present car position. Therefore, if the value of α is not modified suitably, chances are high that only the distributed waiting movement to a nearby floor is permitted and the distributed waiting movement to a faraway floor is inhibited. To avoid this situation, it is desirable that whether to perform distributed waiting be determined on the basis of the average integral power consumption as shown by expression (3).

In addition, when a determination is made on the basis of the peak value (maximum value) of power consumption, the distributed waiting instruction controller 7 gives a distributed waiting permit instruction if the peak value (maximum value) of the power consumption of all the elevators shown in FIG. 6B is less than a preset reference value β of power consumption.

The reference value β is set to about 50% of, for example, the average power consumption per elevator×the number of elevators. When the power consumption of a plurality of cars is considered, it is more desirable that whether to perform distributed waiting be determined on the basis of the peak value of power consumption (or an instantaneous value of electric power) than on the basis of the integral power consumption because the load differs from car to car.

As described above, with the second embodiment, distributed waiting is controlled so that the average integral power consumption or the peak value of power consumption may not exceed a specific reference, taking into account not only the power consumption of a drop-off car serving as a distributed waiting target car but also the power consumption of other cars in operation. By doing this, distributed waiting can be performed more efficiently, while suppressing the power consumption as much as possible.

Third Embodiment

Next, a third embodiment will be explained.

The third embodiment is characterized by interrupting distributed waiting when the operational situation has changed while a distributed waiting target car is moving to a distributed waiting floor.

FIG. 7 is a block diagram showing an overall configuration of an elevator group control apparatus according to the third embodiment. In FIG. 7, the same parts as those of the configuration of FIG. 1 in the first embodiment are indicated by the same reference numerals and an explanation of them will be omitted.

An operational situation monitor 11 is provided in a group control apparatus 3. The operational situation monitor 11 monitors the operational situation of each car on the basis of an operation curve created by an operation curve creation unit 10 and requests a power consumption calculation unit 8 to recalculate power consumption when the operational situation has changed.

In the second embodiment, whether to perform distributed waiting has been determined on the basis of the power consumption of all the elevators, taking into account not only the operational situation of a drop-off car serving as a distributed waiting target car but also the operational situation of each of the other cars.

However, the power consumption calculation unit 8 does calculations according to an operation curve created by the operation curve creation unit 10. The operation curve is created by predicting a derivative car call generated from a platform call and the value of the ride rate which varies each time a car stops at each floor (including a predicted value by statistical data processing performed by a general learning device).

A "derivative car call" means a car call entered in a car by a user who has entered a platform call. Since a goal floor entered as a derivative car call is unknown in an ordinary elevator system until it is actually entered, a predicted value based on statistical data or the like is used. Therefore, when a car is actually operated, a subsequent operational situation might change significantly. For example, when a car in operation has stopped at a floor, more passengers than expected might get on the elevator or a car call might be entered for an unexpected floor.

Therefore, in the third embodiment, the operational situation monitor 11 that monitors the operational situation of each car is provided in the group control apparatus 3. When the operational situation monitor 11 has detected a change in the operational situation, the power consumption calculation unit 8 recalculates power consumption.

If it is seen from the calculation result of the power consumption calculation unit 8 that the peak value (maximum value) of the power consumption of all the elevators is equal to or larger than a preset reference value γ for the interruption of distributed waiting, the distributed waiting instruction output from the distribution instruction controller 7 is withdrawn and the movement of the distributed waiting target car is stopped. The reference value γ is set higher than the reference value β at the initial setting (γ>β), taking recalculation hysteresis into account.

For example, suppose the operational situation of each car is as shown in FIG. 5, the calculation result of power consumption is as shown in FIG. 6B, and car D has been permitted to perform distributed waiting as in the second embodiment. The operational situation monitor 11 is monitoring a change in the floor where each car is scheduled to stop and a change in the ride rate on the basis of an operation curve created by the operation curve creation unit 10. If there is a change, an instruction to recalculate power consumption is output to the power consumption calculation unit 8.

Figure 8:
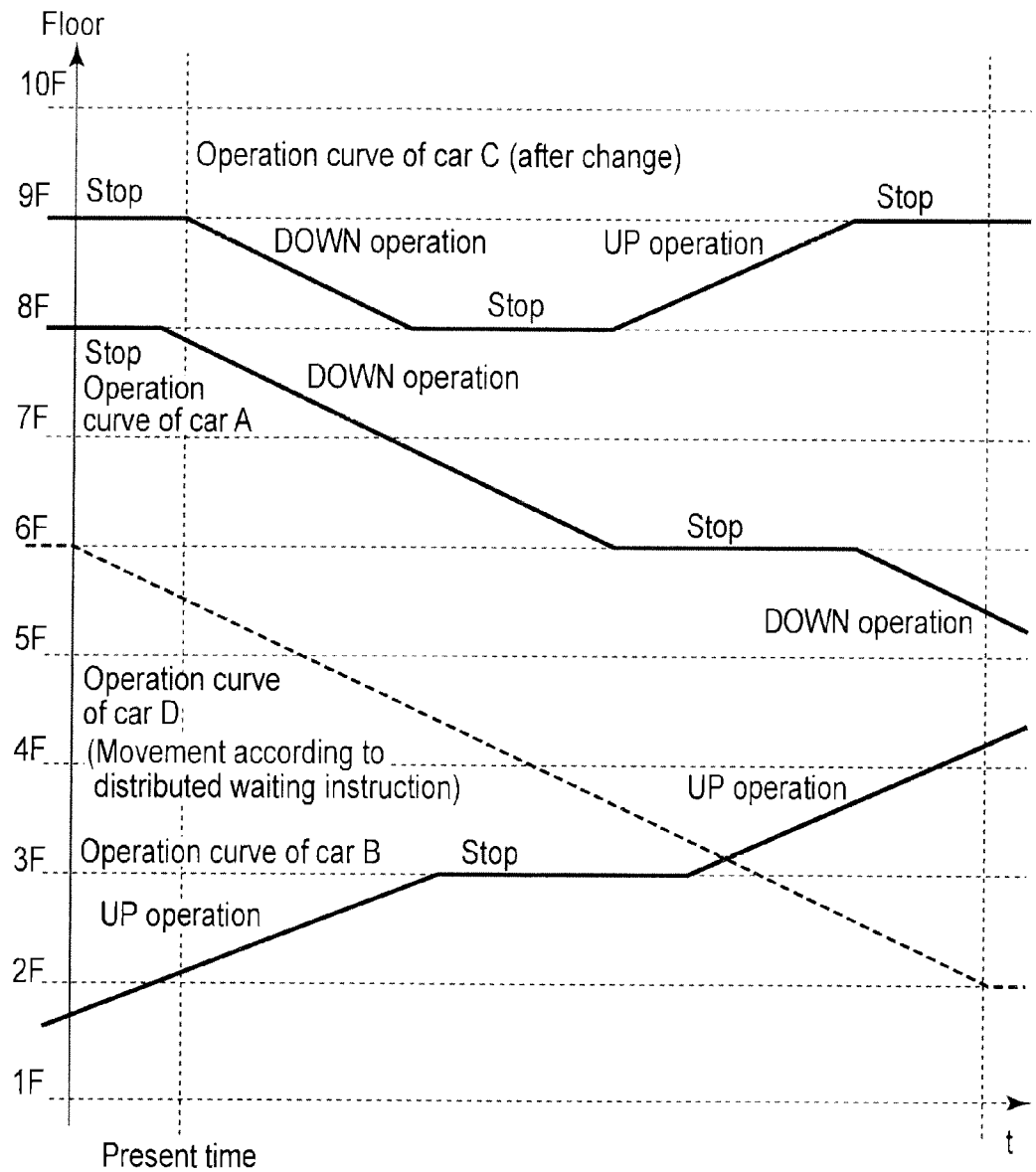
FIG. 8 shows an example of operation curves of cars A to D controlled by the elevator group control apparatus of the third embodiment.
Figure 9:
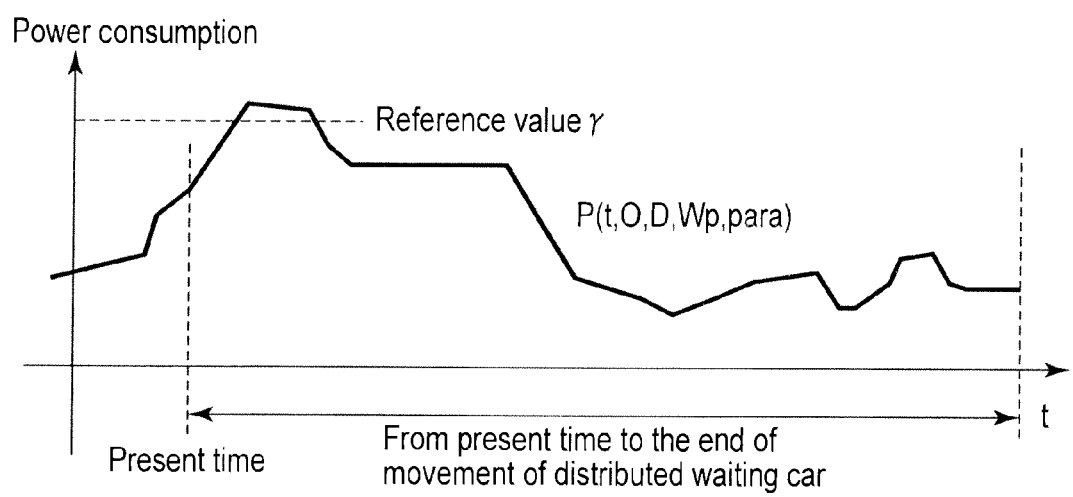
FIG. 9 shows a power consumption recalculation result obtained by a power consumption calculation unit provided in the elevator group control apparatus of the third embodiment.

Suppose there is a call for car C in the waiting state and car C moves as shown in the example of FIG. 8. In this case, the recalculation result of power consumption is as shown in FIG. 9. It is seen from FIG. 9 that the overall power consumption has become higher than in FIG. 6B. Consequently, the peak value of power consumption exceeds the reference value γ. Therefore, the operational situation monitor 11 outputs an instruction to withdraw the distributed waiting instruction to the distribution instruction controller 7, thereby stopping the distributed waiting movement of car D.

While in the third embodiment, the explanation has been given on the assumption that the peak value of power consumption of all the elevators has been used as a criterion for determining whether to perform distributed waiting, the third embodiment may be applied to a case where the total electric energy of all the elevators is used as a criterion for determining whether to perform distributed waiting.

As described above, with the third embodiment, the operational situation of each car is monitored. When the power consumption has become higher than the original calculation result due to a change in the situation during the movement of a distributed waiting target car, the movement of the target car is stopped immediately, thereby enabling electric power to be suppressed so as not to be consumed not less than the reference value.

Fourth Embodiment

Next, a fourth embodiment will be explained.

The fourth embodiment is characterized in that the distribution instruction controller 7 explained in the first to third embodiments is capable of changing the reference values α, β of power consumption and the reference value γ of distributed waiting interruption arbitrarily.

Figure 10:
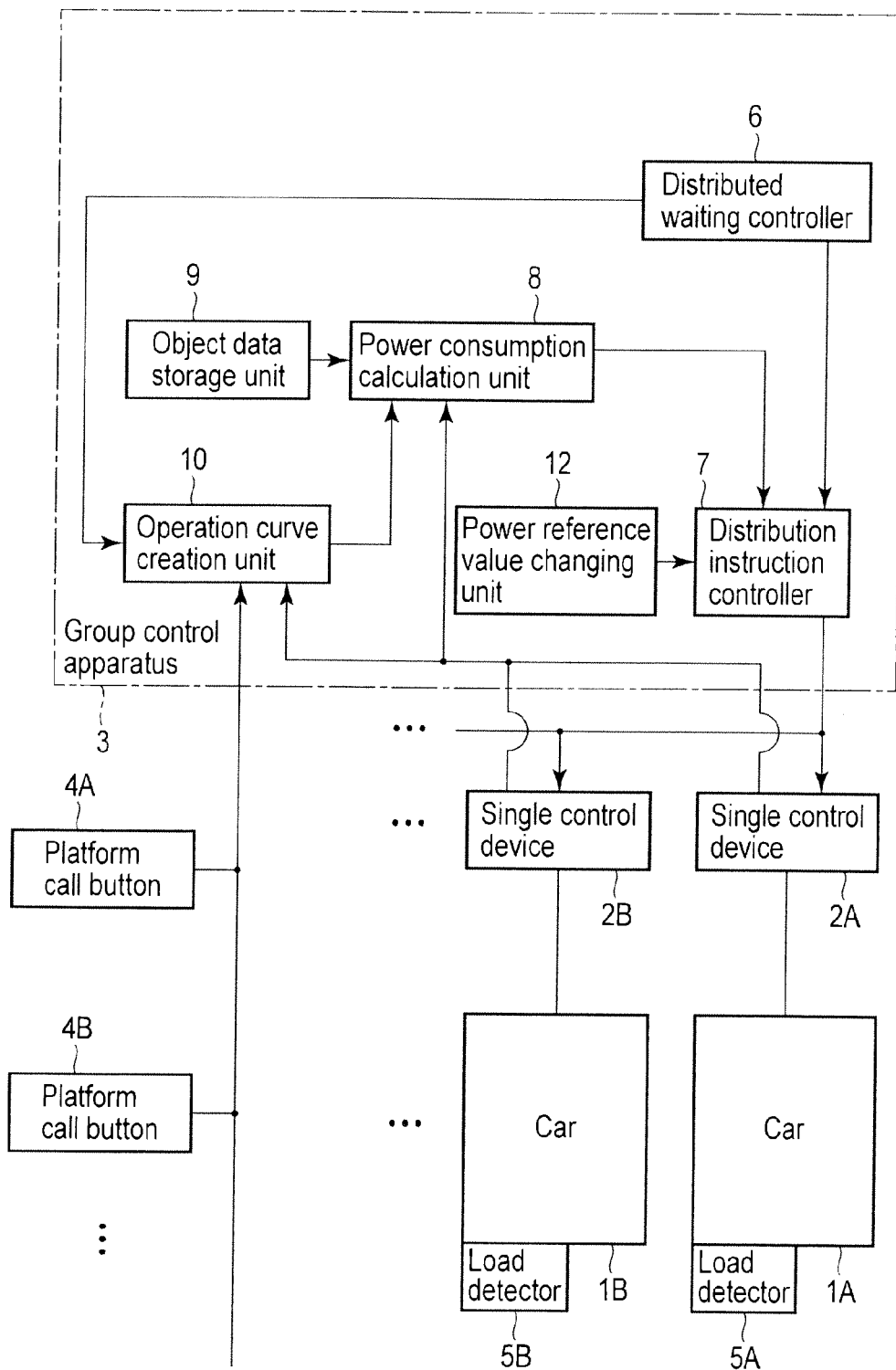
FIG. 10 is a block diagram showing an overall configuration of an elevator group control apparatus according to a fourth embodiment.

FIG. 10 is a block diagram showing an overall configuration of an elevator group control apparatus according to the fourth embodiment. In FIG. 10, the same parts as those of the configuration of FIG. 1 in the first embodiment are indicated by the same reference numerals and an explanation of them will be omitted.

A power reference value changing unit 12 is provided in a group control apparatus 3. If the reference value α of integral power consumption has been set in the distribution instruction controller 7, the power reference value changing unit 12 changes the reference value α set in the distribution instruction controller 7.

A method of changing the reference value includes, for example, a method of causing a maintenance person to access the power reference value changing unit 12 and change the reference value directly with a console and a method of changing the reference value by a signal from a monitor board installed in a monitor room or the like of a building.

In addition, a general statistical data learning device installed in the group control apparatus 3 may be used to learn, for example, the frequency of use of each floor and change the reference value α dynamically on the basis of the learning result.

While the reference value α has been changed, the reference value β or γ may be changed similarly.

As described above, with the fourth embodiment, the reference values of power consumption can be changed arbitrarily. Therefore, the reference values can be determined suitably, taking the power consumption of all the elevators into account, which enables more efficient distributed waiting to be realized.

Fifth Embodiment

Next, a fifth embodiment will be explained.

The fifth embodiment is characterized in that, when there are a plurality of candidates for distributed waiting floors, one of them is selected, taking power consumption into account.

Figure 11:
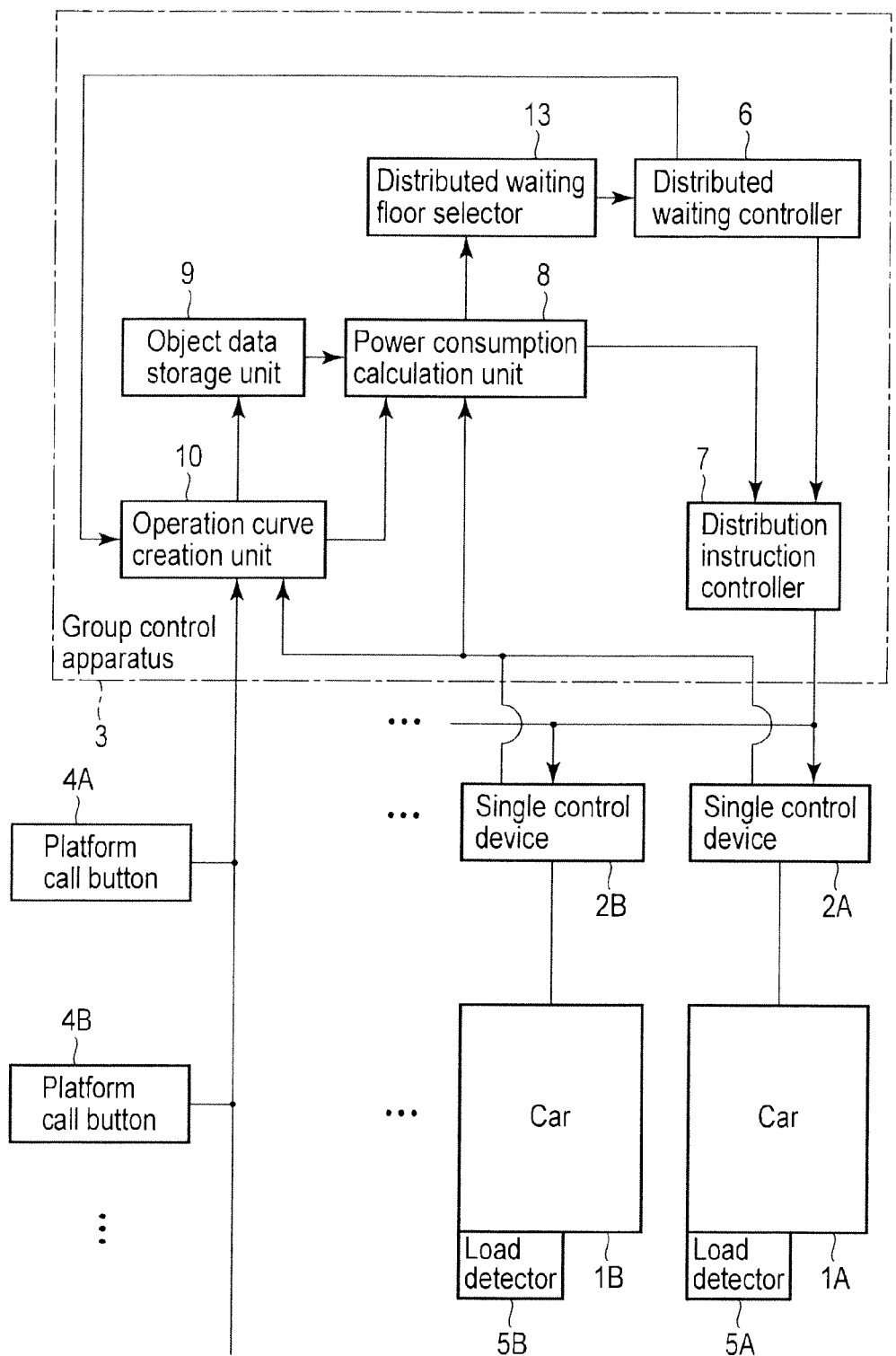
FIG. 11 is a block diagram showing an overall configuration of an elevator group control apparatus according to a fifth embodiment.

FIG. 11 is a block diagram showing an overall configuration of an elevator group control apparatus according to the fifth embodiment. In FIG. 11, the same parts as those of the configuration of FIG. 1 in the first embodiment are indicated by the same reference numerals and an explanation of them will be omitted.

A distributed waiting floor selector 13 is provided in a group control apparatus 3. The distributed waiting floor selector 13 selects a distributed waiting floor on the basis of the calculation result of a power consumption calculation unit 8. It is assumed that there are a plurality of candidates for distributed waiting floors.

Specifically, although the distributed waiting controller 6 determines a distributed waiting floor, taking operation efficiency into account, it is common practice to determine a plurality of candidates rather than a single one. For example, a predetermined specific floor and nearby floors or several floors with a high frequency of occurrence of users based on the rate of occurrence of a user on each floor may be determined in advance as candidates for distributed waiting floors.

Figure 12:
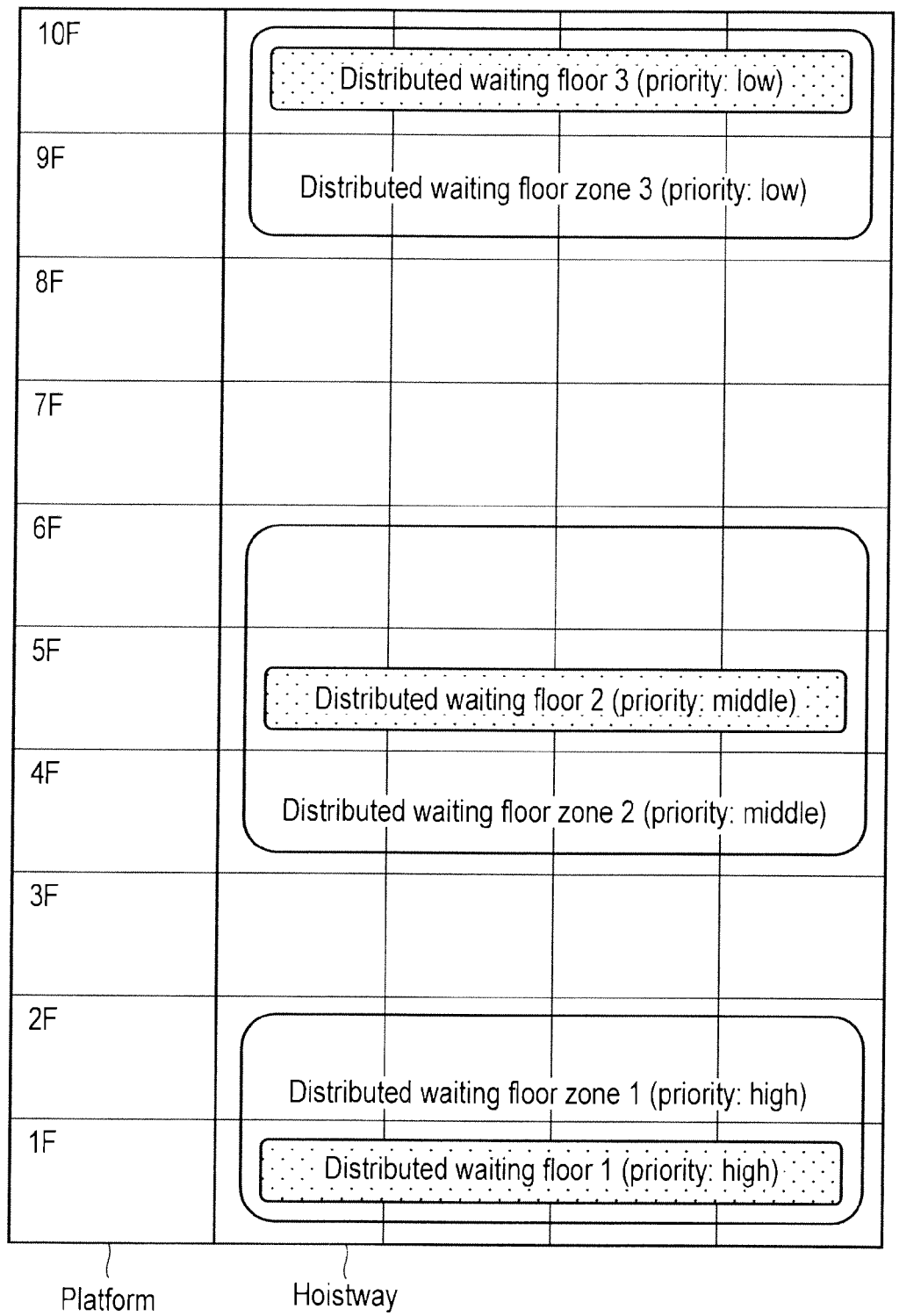
FIG. 12 shows candidates for distributed waiting floors set by a distributed waiting controller provided in the elevator group control apparatus of the fifth embodiment.

Suppose candidates for distributed waiting floors have been determined as shown in FIG. 12. In the example of FIG. 12, 1F, 5F, 10F have been determined as candidates for distributed waiting floors and their priorities are in this order: (highest) 1F>5F>10F (lowest). In addition, distributed waiting zones 1 to 3 are assumed to have been set as floors near distributed waiting floors as shown in FIG. 12.

Generally, in distributed waiting control, when there is no car on a high-priority distributed waiting floor and in a distributed waiting zone, a distributed waiting target car is moved to the distributed waiting floor. The fifth embodiment is characterized by selecting an optimal one from the candidates for distributed waiting floors set by the distributed waiting controller 6 from an energy-saving viewpoint.

To realize this, electric power consumed when a distributed waiting target car (or drop-off car) is moved for each candidate is calculated by the power consumption calculation unit 8. For example, suppose candidates for distributed waiting floors are 1F, 5F, 10F as described above. In conventional distributed waiting control, a distributed waiting target car is moved to 1F with the highest priority.

Here, suppose the result of calculating electric power consumed when a distributed waiting target car is moved to each of 1F, 5F, and 10F has shown that the power consumption when the target car is moved to 10F is less than the reference value α (β) of distributed waiting. In this case, the distributed waiting selector 13 selects 10F as a distributed waiting floor and the distribution instruction controller 7 outputs a distribution instruction to the tenth floor.

If there are a plurality of candidates for each of which the power consumption when the distributed waiting target car is moved is less than the reference value α (β), the final distributed waiting floor is supposed to be selected according to the order of priorities set to the individual candidates. For example, if the power consumption when the distributed waiting target car is moved is less than the reference value α (β) for 5F in addition to 10F, 5F is selected as a distributed waiting floor according to the order of priorities.

As described above, with the fifth embodiment, when there are a plurality of candidates for distributed waiting floors, the optimum distributed waiting floor is selected from an power-saving viewpoint and a distributed waiting target car is moved to the optimum floor, thereby realizing efficient distributed waiting, while suppressing power consumption as much as possible.

Sixth Embodiment

Next, a sixth embodiment will be explained.

The sixth embodiment is characterized in that, when there are a plurality of candidates for distributed waiting target cars, one of them is selected, taking power consumption into account.

Figure 13:
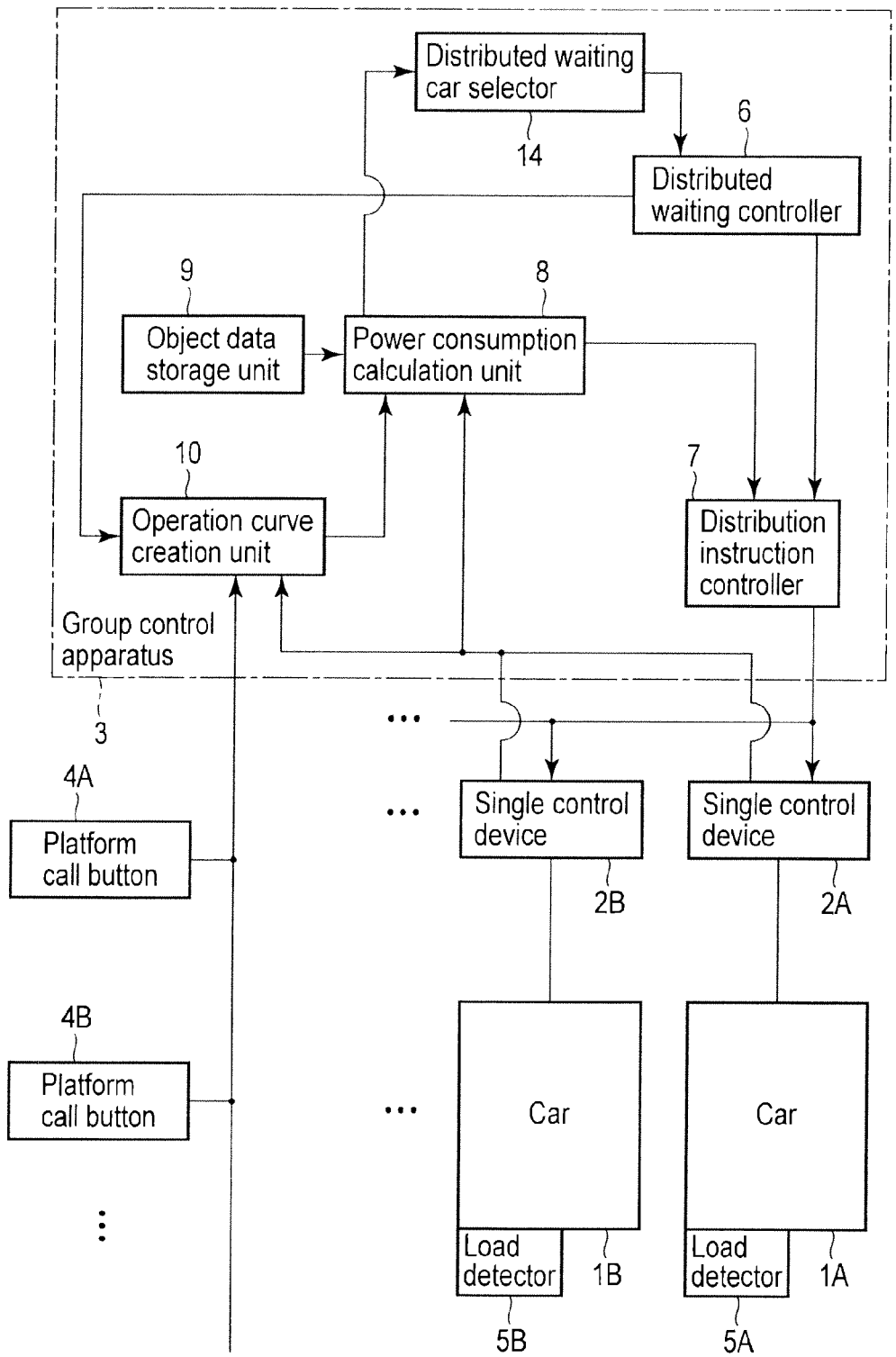
FIG. 13 is a block diagram showing an overall configuration of an elevator group control apparatus according to a sixth embodiment.

FIG. 13 is a block diagram showing an overall configuration of an elevator group control apparatus according to the sixth embodiment. In FIG. 13, the same parts as those of the configuration of FIG. 1 in the first embodiment are indicated by the same reference numerals and an explanation of them will be omitted.

A distributed waiting car selector 14 is provided in a group control apparatus 3. When distributed waiting is performed, more than one drop-off car may be in the waiting state. In such a case, the distributed waiting car selector 14 selects a drop-off car to be moved to a distributed waiting floor determined by a distributed waiting controller 6 as a distributed waiting target car on the basis of the calculation result of a power consumption calculation unit 8.

The calculation method of the power consumption calculation unit 8 is as explained above. A distributed waiting target car is selected by calculating power consumption for each drop-off car and comparing the calculation results. For example, suppose two cars, car C and car D, have been dropped off and remain in the waiting state. In this case, on the basis of the calculation result of the power consumption calculation unit 8, of car C and car D, the one whose power consumption is less than the reference value α (β) is selected as a distributed waiting target car.

Specifically, suppose, for example, the calculation result of power consumption when car C is moved to a distributed waiting floor is as shown in FIG. 14A and the calculation result of power consumption when car D is moved to a distributed waiting floor is as shown in FIG. 14B.

Here, as explained in the second embodiment, suppose whether to perform distributed waiting is determined on the basis of the power consumption of all the elevators including other cars.

If power consumption is not less than the reference value α (β) when car C is moved to a distributed waiting floor and is less than the reference value α (β) when car D is moved to a distributed waiting floor, the distributed waiting car selector 14 selects car D as a distributed waiting target car and the distributed waiting controller 6 receives this selection result and causes the distribution instruction controller 7 to output a distributed waiting instruction to car D.

When both car C and car D satisfy the condition of the reference value, that is, when their power consumption is less than the reference value α (β), both become distributed waiting target cars. In this case, of them, the one whose peak value of power consumption is smaller may be selected. Alternatively, the one whose average integral power consumption is lower may be selected when the average integral power consumption is used as a reference.

When both car C and car D have exceeded the reference value β, this means that there is no distributed waiting target car. In this case, neither car C nor car D is permitted to perform distributed waiting.

In addition, electric power consumed when both car C and car D are moved to a distributed waiting floor simultaneously is calculated. If the power consumption at that time is less than the reference value α (β), these two cars may be permitted to perform distributed waiting.

Furthermore, when there are a plurality of candidates for distributed waiting floors as explained in the fifth embodiment, power consumption is calculated for each of the combinations of distributed waiting target cars and distributed waiting floors. On the basis of the calculation results, the optimum car and distributed waiting floor may be selected in terms of power consumption, thereby performing distributed waiting.

Accordingly, with the sixth embodiment, when there are a plurality of candidates for distributed waiting target cars, an optimal car is selected from a power-saving viewpoint and the car is moved to the distributed waiting floor, thereby enabling efficient distributed waiting to be realized, while suppressing power consumption as much as possible.

As described above, with the above embodiments, it is possible to provide an elevator group control apparatus capable of performing distributed waiting efficiently, while suppressing wasteful power consumption as much as possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An elevator group control apparatus that performs group control of operations of a plurality of cars, the elevator group control apparatus comprising:
   an object data storage unit that stores a unique parameter as object data for each object with regard to a building and an elevator;

an operation curve creation unit that creates an operation curve indicating a future operational situation on the basis of call entry information for each of the cars;

a power consumption calculation unit that calculates power consumption when each of the cars is run according to the operation curve on the basis of object data stored in the object data storage unit and an operation curve created by the operation curve creation unit;

a distributed waiting controller that sets a car in a waiting state among the cars as a distributed waiting target car and outputs a distributed waiting instruction to move the target car to a distributed waiting floor; and a distribution instruction controller that obtains, from the power consumption calculation unit, power consumption when the distributed waiting target car is moved to the distributed waiting floor and, on the basis of the power consumption, permits or inhibits a distributed waiting instruction output from the distributed waiting controller.

2. The elevator group control apparatus according to claim 1, wherein the distribution instruction controller permits the distributed waiting instruction if electric energy corresponding to an integral of power consumption with respect to time, when the distributed waiting target car is moved to the distributed waiting floor, is less than a first reference value previously set.

3. The elevator group control apparatus according to claim 1, wherein the distribution instruction controller permits or inhibits the distributed waiting instruction on the basis of power consumption of the distributed waiting target car and the other cars, taking into account the operational situations of the other cars during the movement of the distributed waiting target car.

4. The elevator group control apparatus according to claim 3, wherein the distribution instruction controller permits the distributed waiting instruction if a time average value of electric energy obtained by adding electric energy corresponding to an integral of power consumption with respect to time, when the distributed waiting target car is moved to the distributed waiting floor, to electric energy corresponding to an integral of power consumption with respect to time, when other cars are moved in the meantime, is less than a first reference value previously set.

5. The elevator group control apparatus according to claim 3, wherein the distribution instruction controller permits the distributed waiting instruction if a peak value of power consumption of the distributed waiting target car and the other cars is less than a second reference value previously set.

6. The elevator group control apparatus according to claim 3, further comprising an operational situation monitor that monitors an operation curve created by the operation curve creation unit and requests the power consumption calculation unit to recalculate power consumption when the operational situation of one other car has changed while the distributed waiting target car is moving to the distributed waiting floor, wherein the distribution instruction controller controls the movement of the distributed waiting target car to the distributed waiting floor on the basis of power consumption recalculated by the power consumption calculation unit.

7. The elevator group control apparatus according to claim 6, wherein the distribution instruction controller interrupts the movement of the distributed waiting target car to the distributed waiting floor when the peak value of power consumption of the distributed waiting target car and the other cars recalculated by the power consumption calculation unit is not less than a third reference value previously set.

8. The elevator group control apparatus according to claim 2, further comprising a power reference value change unit that changes a reference value for the distribution instruction controller to determine whether to perform distributed waiting.

9. The elevator group control apparatus according to claim 1, further comprising a distributed waiting floor selector that, when there are a plurality of candidates for distributed waiting floors, selects a distributed waiting floor to which the distributed waiting target car is to be moved on the basis of power consumption due to the movement of the distributed waiting target car to each of the candidates and outputs a selection result to the distributed waiting controller.

10. The elevator group control apparatus according to claim 1, further comprising a distributed waiting car selector that, when there are a plurality of candidates for distributed waiting target cars, selects a distributed waiting target car to be moved to the distributed waiting floor on the basis of power consumption due to the movement of each of the candidates to the distributed waiting floor and outputs a selection result to the distributed waiting controller.

\* \* \* \* \*